US012386626B2

(12) United States Patent
Bouzguarrou et al.

(10) Patent No.: US 12,386,626 B2
(45) Date of Patent: Aug. 12, 2025

(54) PREDICTING UPCOMING CONTROL FLOW

(71) Applicant: Arm Limited, Cambridge (GB)

(72) Inventors: Houdhaifa Bouzguarrou, Valbonne (FR); Guillaume Bolbenes, Vallauris (FR); Thibaut Elie Lanois, Peymeinade (FR); Vincenzo Consales, Golfe Juan (FR); Chang Joo Lee, Austin, TX (US)

(73) Assignee: Arm Limited, Cambridge (GB)

( * ) Notice: Subject to any disclaimer, the term of this patent is extended or adjusted under 35 U.S.C. 154(b) by 43 days.

(21) Appl. No.: 17/557,583

(22) Filed: Dec. 21, 2021

(65) Prior Publication Data

US 2023/0195468 A1 Jun. 22, 2023

(51) Int. Cl.
*G06F 9/38* (2018.01)
*G06F 9/30* (2018.01)
*G06F 9/32* (2018.01)

(52) U.S. Cl.
CPC .......... *G06F 9/3844* (2013.01); *G06F 9/3005* (2013.01); *G06F 9/323* (2023.08); *G06F 9/3806* (2013.01)

(58) Field of Classification Search
CPC .. G06F 9/3005; G06F 9/30058; G06F 9/3806; G06F 9/3842; G06F 9/3844;
(Continued)

(56) References Cited

U.S. PATENT DOCUMENTS

2017/0132009 A1* 5/2017 Pota ................... G06F 12/0875
2019/0258485 A1* 8/2019 Bouzgarrou .......... G06F 9/3844
(Continued)

OTHER PUBLICATIONS

A. Seznec, "Storage free confidence estimation for the TAGE branch predictor," 2011 IEEE 17th International Symposium on High Performance Computer Architecture, San Antonio, TX, USA, pp. 443-454, (Year: 2011).*

*Primary Examiner* — Andrew Caldwell
*Assistant Examiner* — Kasim Alli
(74) *Attorney, Agent, or Firm* — NIXON & VANDERHYE P.C.

(57) ABSTRACT

An apparatus has a fetch queue to identify a sequence of instructions to be fetched for execution and prediction circuitry to predict upcoming control flow and to control which instructions are identified in the fetch queue in dependence on the prediction. The prediction circuitry predicts multi-taken sequences which are sequences of instructions in which control flow is diverted by a first control flow changing instruction to a series of instructions terminating in a second control flow changing instruction that diverts control flow to a target address. The apparatus also has prediction confidence calculation circuitry to calculate confidence levels for respective multi-taken sequences. Each confidence level is indicative of a confidence in an accuracy of prediction of its respective multi-taken sequence. When the confidence level for a particular multi-taken sequence satisfies a prediction confidence condition, the prediction confidence tracking circuitry allows the particular multi-taken sequence to be predicted by the prediction circuitry. The prediction circuitry causes the series of instructions and the target instruction for the particular multi-taken sequence to be identified in the fetch queue when the prediction circuitry predicts the particular multi-taken sequence and further predictions to be made starting from the target address for the particular multi-taken sequence.

19 Claims, 7 Drawing Sheets

(58) Field of Classification Search
CPC ...... G06F 9/3846; G06F 9/3848; G06F 9/323; G06F 9/30054; G06F 9/30061; G06F 9/322; G06F 9/3804
See application file for complete search history.

(56) References Cited

U.S. PATENT DOCUMENTS

| | | | |
|---|---|---|---|
| 2019/0369999 A1* | 12/2019 | Evers | G06F 9/30058 |
| 2020/0065111 A1* | 2/2020 | Bouzguarrou | G06F 9/3806 |
| 2020/0110615 A1* | 4/2020 | Ishii | G06F 9/3005 |
| 2020/0150967 A1* | 5/2020 | Ishii | G06F 9/3806 |
| 2020/0310811 A1 | 10/2020 | Ishii et al. | |
| 2020/0387380 A1* | 12/2020 | Bouzguarrou | G06F 9/3844 |

* cited by examiner

TARGET PREDICTION ENTRY
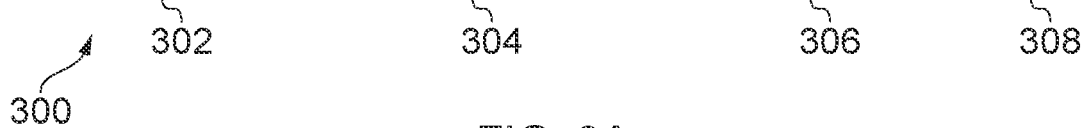
FIG. 3A
TARGET PREDICTION ENTRY (USING OFFSET)
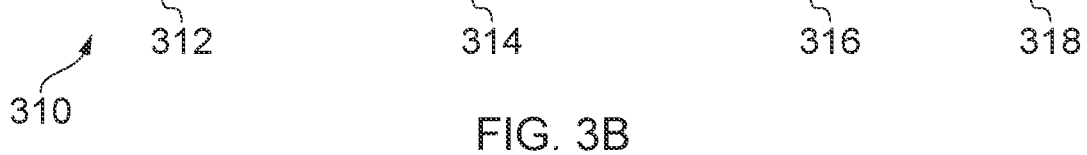
FIG. 3B
TARGET PREDICTION ENTRY (IN BTB)
FIG. 3C

CONFIDENCE INFORMATION STORAGE ENTRY

PREDICTING UPCOMING CONTROL FLOW

BACKGROUND

The present technique relates to data processing. More particularly, the present technique relates to predicting upcoming control flow.

Within a data processing apparatus, execution circuitry may be provided for executing instructions. A fetch queue may be provided to identify instructions to be fetched from memory for execution by the execution circuitry.

Typically, instructions from sequential addresses in memory will be executed until a control flow changing instruction is encountered. A control flow changing instruction is any instruction, the execution of which causes a discontinuous jump in the instruction address space between that instruction and the next instruction to be executed. For example, control flow changing instructions may be function call instructions, function return instructions, branch instructions, etc. Execution of such a control flow changing instruction may therefore cause a discontiguous change in the address, such that the next instruction executed after the instruction flow changing instruction is at a target address determined for the control flow changing instruction, rather than the immediately following instruction within the instruction address space. In order to identify instructions that will require execution by the execution circuitry in the event of such control flow changing instructions being taken and so identify those required instructions in the fetch queue, prediction circuitry may be provided to make predictions in respect of such control flow changing instructions, for example to identify whether those instructions will be taken or not taken, and, if those instructions are taken, to predict the target address of the next instruction to be executed. The predictions made by the prediction circuitry can then be used to control which instructions are identified in the fetch queue.

SUMMARY

In one example arrangement, there is provided an apparatus comprising: a fetch queue to identify a sequence of instructions to be fetched for execution; prediction circuitry to predict upcoming control flow and to control which instructions are identified in the fetch queue in dependence on the prediction, wherein the prediction circuitry is operable to predict multi-taken sequences, wherein a multi-taken sequence is a sequence of instructions in which control flow is diverted by a first control flow changing instruction to a series of instructions terminating in a second control flow changing instruction that diverts control flow to a target address; and prediction confidence calculation circuitry to calculate confidence levels for respective multi-taken sequences, each said confidence level being indicative of a confidence in an accuracy of prediction of its respective multi-taken sequence, wherein the prediction confidence tracking circuitry is configured to allow, when the confidence level for a particular multi-taken sequence satisfies a prediction confidence condition, the particular multi-taken sequence to be predicted by the prediction circuitry, wherein the prediction circuitry is configured to cause, when the prediction circuitry predicts the particular multi-taken sequence, the series of instructions and the target instruction for the particular multi-taken sequence to be identified in the fetch queue and to begin making further predictions starting from the target address for the particular multi-taken sequence.

In another example arrangement, there is provided a method of making predictions for control flow changing instructions comprising: identifying within a fetch queue a sequence of instructions to be fetched for execution; predicting upcoming control flow and controlling which instructions are identified in the fetch queue in dependence on the prediction; wherein predicting the upcoming control flow comprises predicting multi-taken sequences, wherein a multi-taken sequence is a sequence of instructions in which control flow is diverted by a first control flow changing instruction to a series of instructions terminating in a second control flow changing instruction that diverts control flow to a target address; calculating confidence levels for respective multi-taken sequences, each said confidence level being indicative of a confidence in an accuracy of prediction of its respective multi-taken sequence; allowing, when the confidence level for a particular multi-taken sequence satisfies a prediction confidence condition, the particular multi-taken sequence to be predicted by the prediction circuitry; causing, when the particular multi-taken sequence is predicted, the series of instructions and the target instruction for the multi-taken sequence to be identified in the fetch queue; and beginning to make further predictions starting from the target address for the particular multi-taken sequence.

In a yet further example arrangement, there is provided a non-transitory computer-readable medium to store computer-readable code for fabrication of an apparatus comprising: a fetch queue to identify a sequence of instructions to be fetched for execution; prediction circuitry to predict upcoming control flow and to control which instructions are identified in the fetch queue in dependence on the prediction, wherein the prediction circuitry is operable to predict multi-taken sequences, wherein a multi-taken sequence is a sequence of instructions in which control flow is diverted by a first control flow changing instruction to a series of instructions terminating in a second control flow changing instruction that diverts control flow to a target address; and prediction confidence calculation circuitry to calculate confidence levels for respective multi-taken sequences, each said confidence level being indicative of a confidence in an accuracy of prediction of its respective multi-taken sequence, wherein the prediction confidence tracking circuitry is configured to allow, when the confidence level for a particular multi-taken sequence satisfies a prediction confidence condition, the particular multi-taken sequence to be predicted by the prediction circuitry, wherein the prediction circuitry is configured to cause, when the prediction circuitry predicts the particular multi-taken sequence, the series of instructions and the target instruction for the particular multi-taken sequence to be identified in the fetch queue and to begin making further predictions starting from the target address for the particular multi-taken sequence.

BRIEF DESCRIPTION OF THE DRAWINGS

Further aspects, features, and advantages of the present technique will be apparent from the following description of examples, which is to be read in conjunction with the accompanying drawings, in which:

FIGS. 3A-3C illustrate example entries in target prediction storage;

DESCRIPTION OF EXAMPLES

Figure 1:
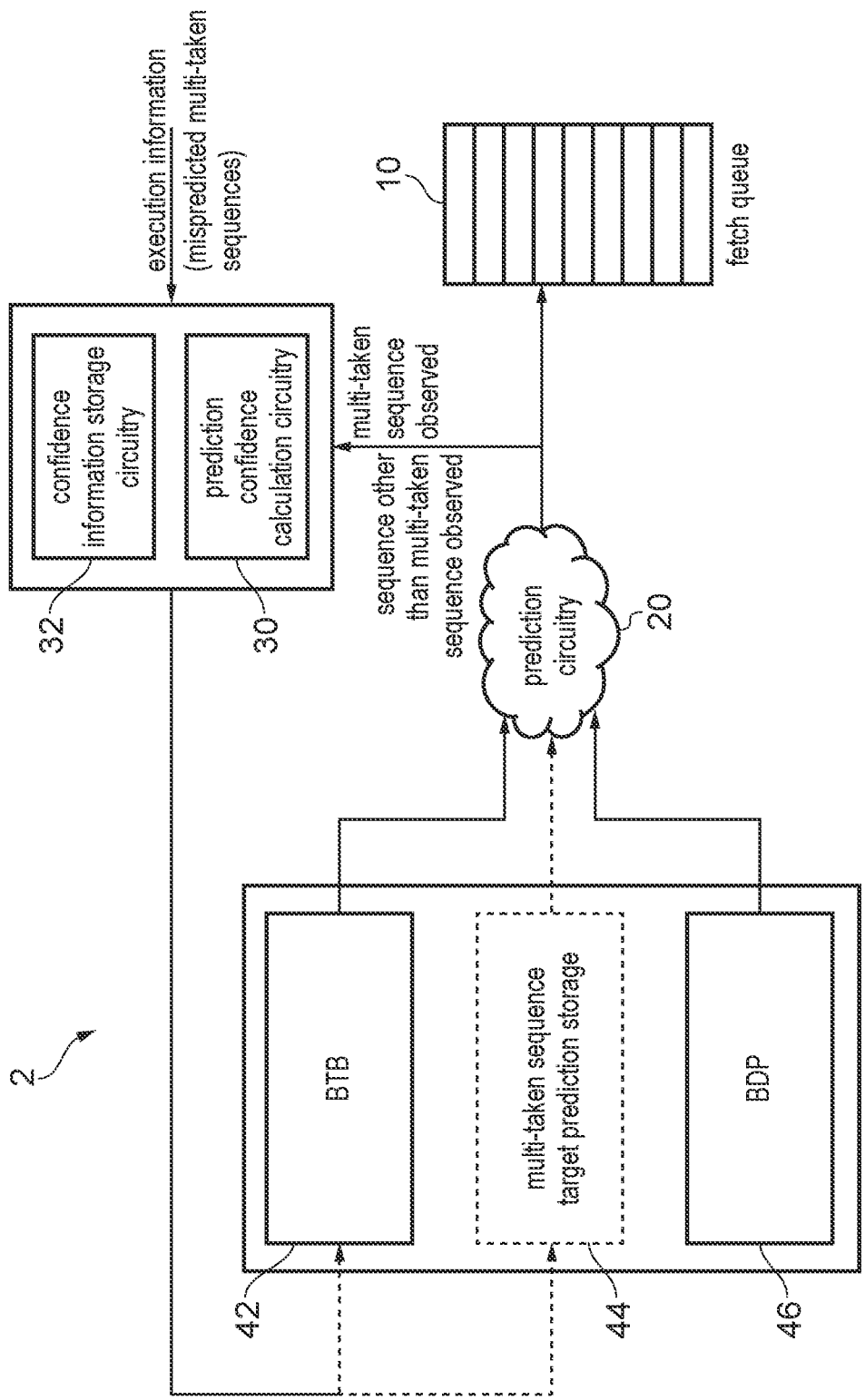
FIG. 1 is a schematic illustrating an apparatus in accordance with an example implementation.

Before discussing the embodiments with reference to the accompanying figures, the following description of embodiments is provided.

In typical systems, an iteration of prediction by prediction circuitry involves the following process:
1. Detect whether a control flow changing instruction is predicted at a given instruction address, PC (program counter)=X;
2. Predict the direction for the control flow changing instruction (i.e. taken or not taken) if a control flow changing instruction has been predicted for the instruction address PC=X);
3. Predict the target address, PC=Y, if the predicted control flow changing instruction is predicted as taken; and
4. Update the program counter value to Y if it is predicted that the control flow changing instruction is taken, and if not update the program counter value to the next sequential address (e.g. X+4 in scenarios where each instruction occupies four bytes within the instruction address space).

In some comparative examples that do not implement the present disclosure, prediction circuitry can consider a predict block of instructions in one iteration, the predict block comprising a plurality of sequential instructions within the memory address space, for example the instructions at addresses PC=X, X+4, X+8, X+12, . . . ). However, the prediction circuitry in such comparative examples cannot process a control flow changing instruction and its target instruction in the same iteration.

However, in accordance with the techniques described herein, there is provided an apparatus capable of predicting more than one control flow changing instruction as part of a single prediction. That is, the apparatus is able to predict, in a single prediction, a sequence of instructions involving a first control flow changing instructions that is predicted to divert control flow to a series of instructions such that that series of instructions is executed. The series of instructions is a sequential sequence of instructions in the instruction address space that terminates in a second control flow changing instruction that diverts control flow to a target address. By predicting this entire sequence, referred to herein as a multi-taken sequence, in one go, the apparatus is able to cause the entire multi-taken sequence to be identified in the fetch queue and for predictions to begin starting from the target address. This approach can therefore improve the bandwidth of prediction circuitry of the apparatus so as to increase the rate at which instructions can be identified within the fetch queue. In particular, the techniques described herein allow predictions in respect of the first control flow changing instruction and the second control flow changing instruction to be made in the same clock cycle.

Of particular concern in the context of predicting control flow is avoiding or reducing instances of misprediction. In a pipelined processor architecture, the instructions identified in the fetch queue are typically fetched from memory (which can be a time-consuming process) and may proceed through several stages of the pipeline (e.g., fetch, decode, rename, issue) before it is known whether the prediction that caused those instructions to be fetched is correct. Misprediction therefore means that the pipeline needs to be flushed, with the instructions that have been fetched and operated on in the pipeline being discarded. Misprediction of this form can have a relatively large impact on the performance of the processor and so it is desirable to avoid such misprediction. The accuracy of prediction of upcoming control flow is therefore of significant concern.

Mindful of avoiding instances of misprediction, one approach to predicting a multi-taken sequence may involve predicting only multi-taken sequences that it can be determined are sure to be followed. This could be done by only predicting multi-taken sequences for which the first control flow changing instruction diverts control flow to a series of instructions which exhibit static behaviour. If a series of instructions is expected to exhibit static behaviour, this means that the behaviour of that series of instructions will not change each time that series is encountered. As a result, this means that if the first control flow changing instruction is taken, causing a branch to the start of its associated series of instructions, it is expected that all of the series of instructions will be executed (i.e., there are no other control flow changing instructions in the series of instructions), resulting in the second control flow changing instruction also being executed. Further, for the series of instructions to be considered to exhibit static behaviour, the second control flow changing instruction is unconditional, such that it is known that that second control flow changing instruction will be taken and hence will result in a branch to the associated target address.

By only predicting multi-taken sequences that exhibit static behaviour in this way, the prediction circuitry can rely on existing mechanisms for predicting the first control flow changing instruction (e.g., whether the branch will be taken and the target of the branch) which are assumed to already have a desired accuracy of prediction with no additional risk of misprediction being introduced by virtue of predicting the second control flow changing instruction since its behaviour is static.

However, whilst this approach allows multi-taken sequences to be predicted in some cases and so benefits from the consequent improved prediction bandwidth, according to this approach many opportunities for predicting multi-taken sequences may be missed. The inventors recognised that at least some of these multi-taken sequences that do not exhibit static behaviour could nonetheless be predicted with a high degree of confidence and so the prediction bandwidth of the apparatus improved with only minor losses in accuracy of prediction. Thus it may be determined that the benefits of predicting additional multi-taken sequences outweighs the cost of the rare mispredictions. This is because in many cases multi-taken sequences, even when not exhibiting entirely static behaviour, do nonetheless behave with a high level of consistency such that predictions in respect of those multi-taken sequences may be made with a high degree of confidence.

In accordance with the techniques described herein, an apparatus is provided that has a fetch queue to identify a sequence of instructions to be fetched for execution by execution circuitry. There are a number of ways in which the instructions can be identified within the fetch queue, but in one example arrangement the instructions in the fetch queue are identified by specifying address information for those instructions, with that address information then being used in order to fetch the associated instructions from memory. The apparatus also has prediction circuitry to predict upcoming control flow and to control which instructions are identified in the fetch queue in dependence on those predictions.

In accordance with the techniques described herein, the prediction circuitry is operable to predict multi-taken sequences. In some examples, the prediction circuitry is also operable to predict control flow changing instructions not forming part of a multi-taken sequence, whereas in some examples, the prediction circuitry may be dedicated multi-taken sequence prediction circuitry with separate prediction circuitry provided for making other types of predictions.

So that the prediction circuitry is able to determine which multi-taken sequences should be predicted, the apparatus is also provided with prediction confidence calculation circuitry to calculate confidence levels for respective multi-taken sequences. That is, the prediction confidence calculation circuitry is configured to calculate, for a plurality of multi-taken sequences, a respective confidence level indicative of a confidence in the accuracy of prediction for that multi-taken sequence. The prediction confidence calculation circuitry therefore provides a measure of the likelihood that a prediction of a particular multi-taken sequence will turn out to be correct if predicted.

Based on this confidence level, the prediction confidence calculation circuity can determine whether to allow the prediction circuitry to predict the particular multi-taken sequence. Hence, when the confidence level indicates that the multi-taken sequence is likely to be taken, and so is likely to be predicted correctly if predicted, the prediction confidence calculation circuitry may allow the prediction circuitry to predict this multi-taken sequence. To evaluate whether the confidence level for the particular multi-taken sequence is sufficient to allow the sequence to be predicted, the prediction confidence calculation circuitry may impose a prediction confidence condition which when satisfied for a multi-taken sequence indicates that that that multi-taken sequence can be predicted. The prediction confidence condition may be consistent for all multi-taken sequences such that the required confidence level in order to satisfy the condition is the same regardless of the multi-taken sequence, or in some examples, a different prediction confidence condition may be used for different multi-taken sequences. The prediction confidence calculation may be implemented as a threshold such that if the confidence level satisfies (e.g., meets or exceeds) the threshold, the prediction confidence condition is satisfied.

Conversely, when the confidence level for the particular multi-taken sequence does not satisfy the prediction confidence condition, the prediction confidence calculation circuitry may be configured to prevent the prediction circuitry predicting the particular multi-taken sequence. In this way, the prediction circuitry can be prevented from predicting multi-taken sequences for which the likelihood that the prediction will be made correctly is not sufficiently high to outweigh the risk of misprediction and the associated performance costs associated therewith.

With the prediction circuitry allowed to predict a particular multi-taken sequence based on the determination by the prediction confidence calculation circuitry, when the first control flow changing instruction of the particular multi-taken sequence is encountered, the prediction circuitry may predict that the multi-taken sequence will be taken. Based on this prediction, the prediction circuitry may cause the series of instructions to which the first control flow changing instruction is expected to divert control flow to be identified in the fetch queue along with the target address of the second control flow changing instruction. The prediction circuitry can then make further predictions starting from the target address for the particular multi-taken sequence (i.e., the target address of the second control flow changing instruction).

Thus, the apparatus is able to predict multi-taken sequences, including multi-taken sequences that do not exhibit static behaviour. This allows the apparatus to benefit from the improved prediction bandwidth associated with being able to predict more than one control flow changing instruction at a time while the prediction confidence calculation circuitry ensures that the predictions are made with sufficient confidence that it is highly likely that the prediction will be made correctly and the performance penalty of the rare instances of misprediction will be outweighed by the benefits of predicting these multi-taken sequences.

The techniques described herein may allow the prediction circuitry to predict multi-taken sequences that it would otherwise not be able to predict. For example, according to an approach in which only multi-taken sequences that exhibit static behaviour are predicted, if the second control flow changing instruction is a conditional control flow changing instruction (e.g., a conditional branch instruction), that multi-taken sequence will never be predicted since it cannot be known for sure whether the second control flow changing instruction will be taken or not. In accordance with examples of the present technique, conditional multi-taken sequences for which the second control flow changing instruction is a conditional control flow changing instruction may however be predicted. To support such predictions, the prediction confidence calculation may calculate the confidence level for a given multi-taken sequence based at least in part on a confidence that the second control flow changing instruction of the given conditional multi-taken sequence will be taken. In this way, the prediction confidence calculation circuitry can take account of the uncertainty in whether the conditional second control flow changing instruction will be taken or not when determining whether to allow the conditional multi-taken sequence to be predicted. For example, a conditional multi-taken sequence may have a conditional second control flow changing instruction that exhibits relatively stable behaviour. In this example, the prediction confidence calculation circuitry may observe that the second control flow changing instruction has been taken many times in a row such that it is considered likely that the next time that multi-taken sequence is observed, the second control flow changing instruction will also be taken. In this case, the prediction confidence calculation circuitry may allow the prediction circuitry to predict the multi-taken sequence. Conversely, in a case whether the second conditional control flow changing instruction for a multi-taken sequence is unstable and so it is not known with confidence whether the control flow changing instruction will be taken or not, the prediction confidence calculation circuitry may prevent the multi-taken sequence being predicted. In this way, multi-taken sequences having conditional control flow changing instructions as their second control flow changing instructions can be predicted, allowing the prediction circuitry to predict more multi-taken sequences than would otherwise be possible, thereby improving the prediction bandwidth whilst also providing a mechanism to ensure the required accuracy of prediction is maintained.

Another example of a multi-taken sequence that may be predicted using the techniques described herein is a multi-taken sequence that includes one or more control flow changing instructions occurring in the series of instructions predicted to be executed following the first control flow changing instruction but before the second control flow changing instructions. These intervening control flow changing instructions may be conditional control flow changing instructions such that they may not be taken. This particular form of multi-taken sequence can cause difficulties in predicting multi-taken sequences: by virtue of the presence of these control flow changing instructions, even if they are not expected to be taken, the prediction circuitry cannot be sure that the multi-taken sequence will be executed (i.e., if one of these intervening control flow changing instructions is taken). To address this uncertainty, the prediction confidence calculation circuitry may be configured to calculate the confidence level for a given multi-taken sequence based at least in part on a confidence that any conditional control flow changing instructions occurring in the series of instructions before the second control flow changing instruction will not be taken. Thus, the confidence level may represent not only a confidence that second control flow changing instruction will be taken but also a confidence that no intervening control flow changing instructions will be taken.

In addition to the example multi-taken sequences mentioned above, it should be noted that the prediction circuitry may also be operable to predict sure multi-taken sequences for which, if the first control flow changing instruction is correctly predicted as being taken, the rest of the multi-taken sequence can be known to be correctly predicted. This may correspond to the second control flow changing instruction being an unconditional control flow changing instruction and the series of instructions to which control flow is diverted by the first control flow changing instruction being absent any control flow changing instructions other than the second control flow changing instruction in which the series of instructions terminates. For efficient operation of the apparatus, the prediction confidence calculation circuitry may suppress calculation of a confidence level for such sure multi-taken sequences since it is known that if the first control flow changing instruction is correctly predicted, the rest of the multi-taken sequence will proceed as predicted. Thus, the prediction confidence calculation circuitry can save power and space in storage structures by allowing the prediction circuitry to predict the sure multi-taken sequences without calculation of a confidence level.

In some examples however, it may be more efficient to provide more consistent operation across all multi-taken sequences such that the prediction confidence calculation circuitry may nonetheless calculate a confidence level for such sure multi-taken sequences. In this case, the sure multi-taken sequence may automatically be assigned a maximum confidence level or the prediction confidence condition set such that the confidence level will always satisfy the prediction confidence condition. In some examples however, the sure multi-taken sequences may be handled in the same manner as other multi-taken sequences using the same scheme for tracking confidence levels as would be used for any other multi-taken sequence (examples of which are discussed in more detail herein).

As explained above, instances of misprediction can have a relatively severe impact on the performance of a processor. Therefore, to reduce the likelihood that a multi-taken sequence will be incorrectly predicted, the prediction confidence calculation circuitry may be configured to detect a confidence lowering event in respect of a given multi-taken sequence and, in response to detecting the confidence lowering event, prevent the prediction circuitry predicting the given multi-taken sequence.

The confidence lowering event may be any event that is indicative that the likelihood that the next time the multi-taken sequence is encountered it will not be taken has reduced. For example, the prediction confidence event may be detected in case of a misprediction occurring with respect to the given multi-taken sequence. In this case, the prediction confidence calculation circuitry may be arranged to receive at least some execution information indicative of the instructions executed at the execution circuitry, or the results of such execution. Therefore, if the given multi-taken sequence was predicted, and so the fetch queue was populated on the basis of this prediction, but the multi-taken sequence turned out to be mispredicted (e.g., because an intervening control flow changing instruction in the series of instructions being taken, or the second control flow changing instruction not being taken), the confidence lowering event will be detected. Since a misprediction of a multi-taken sequence may be an indication that the confidence level for a given multi-taken sequence is set too high, the confidence level can then be reduced so as to reflect the perceived reduced likelihood that the multi-taken sequence will be taken next time it is encountered. In some examples, in response to detecting a misprediction of this form, the prediction confidence calculation circuitry may be configured to lower the confidence level so as to prevent the multi-taken sequence being predicted next time it is encountered.

A confidence lowering event may additionally or alternatively be detected when a sequence of instructions other than the given multi-taken sequence is observed following the first control flow changing instruction for the given multi-taken sequence. The observed sequence of instructions may for example a sequence of instructions observed in execution circuitry and so be reflective of the actual instructions being executed. In some examples however, the sequence of instructions is observed based on the predicted instructions sent to the fetch queue for fetching. Although these instructions are not necessarily entirely representative of the instructions that will be executed, observing the predicted instructions may be easier than observing the results of the execution and where the accuracy of prediction is high, and in most cases the predicted instructions will correspond to the instructions that are actually executed.

In any case, if the sequence of instructions beginning with the first control flow changing instruction for a multi-taken sequence are observed but the rest of the multi-taken sequence is not observed, then the confidence level can be lowered. The prediction confidence calculation circuitry can therefore respond to observed sequences of instructions even where the given multi-taken sequence was not predicted and so no misprediction has occurred in connection with this sequence of instructions being observed. However, the fact that the multi-taken sequence itself was not observed in this instance may be indicative of a reduced confidence that the multi-taken sequence could be correctly predicted as being taken the next time the first control flow changing instruction is encountered.

A sequence of instructions other than the multi-taken sequence may be observed following the first control flow changing instruction as a result of an intervening control flow changing instruction in the series of instructions before the second control flow changing instruction being taken or due to the second control flow changing instruction not being taken for example.

In order to track the confidence level for the multi-taken sequences, the prediction confidence may maintain and reference confidence information. Consequently, in some examples the apparatus is provided with confidence information storage circuitry to store confidence information. The prediction confidence calculation circuitry maintains the confidence information in the confidence information storage circuitry, for example by updating the confidence information in response to observed instances of the multi-taken sequence being predicted or executed, mispredictions, or observed instances of sequences other than the multi-taken sequence, as described above. The confidence information may comprise the confidence level used by the prediction confidence calculation circuitry to determine whether to allow the prediction circuitry to predict the multi-taken sequence.

The confidence information may take a number of forms. However, in some examples, the confidence information stored by the confidence information storage circuitry comprises the confidence level and a threshold for each of a plurality of multi-taken sequences. In this case, the prediction confidence condition evaluated by the prediction confidence calculation circuitry is satisfied, and thus the multi-taken sequence is allowed to be predicted, when the confidence level satisfies the threshold. The threshold may be considered satisfied when the confidence level is equal to the threshold, when the confidence level has a value greater than the threshold, when the confidence level has a value greater than or equal to the threshold, when the confidence level has a value less than the threshold, or when the confidence level has a value less than or equal to the threshold.

By providing a separate threshold for each of the plurality of multi-taken sequences, a difference in required confidence can be reflected for different multi-taken sequences. For example, a multi-taken sequence that has been incorrectly predicted several times may have a higher threshold and so require a higher confidence level for the prediction to be allowed than a multi-taken sequence that has not been the subject of a misprediction.

How the prediction confidence calculation circuitry maintains the confidence level and the threshold for the multi-taken sequences may be implemented in a number of possible ways. However, in some examples, the prediction confidence calculation circuitry is configured to increase the confidence level of the particular multi-taken sequence when the particular multi-taken sequence is observed. As discussed above, this observation could occur either as the instructions are predicted in which case the observation would be an observation of predicted instructions, or the observation could be based on the actual execution information. In some examples, the increase in confidence level is based on observing the particular multi-taken sequence when it is predicted by the prediction circuitry (rather than based on the execution information) since this can be implemented more easily based on the information that is already available in branch prediction circuitry rather than having to provide an additional mechanism to feed back data from the execution circuitry.

It should be noted that the confidence level is only increased on observing the particular multi-taken sequence in one of prediction and execution so as to avoid increasing the confidence level twice for the particular multi-taken sequence based on the same occurrence of that sequence.

In addition to, or as well as increasing the confidence level when the particular multi-taken sequence is observed as discussed above, the prediction confidence calculation circuitry may be configured to reset the confidence level (e.g., to zero or another default value) when either a sequence of instructions other than the particular multi-taken sequence is observed following the first control flow changing instruction or a misprediction occurs using the particular multi-taken sequence. Both of these cases represent an instance of a sequence of instructions following the first control changing instruction other than the multi-taken sequence being observed. By resetting the confidence level in such cases, the prediction confidence calculation circuitry is able to react to a perceived drop in confidence that the multi-taken sequence could be correctly predicted. With the confidence level reset in this way, the multi-taken sequence will therefore not be predicted until the multi-taken sequence has been observed a sufficient number of times that the confidence level has increased as to satisfy the threshold.

The prediction circuitry mispredicting a particular multi-taken sequence may be taken as an indication that the threshold used to determine that the prediction circuitry was allowed to predict the particular multi-taken sequence was set too low. Therefore, to seek to avoid or reduce the incidence of such cases of misprediction, the prediction confidence calculation circuitry may be responsive to detecting a misprediction in respect of a particular multi-taken sequence to increase the threshold for the particular multi-taken sequence. With the threshold increased in this way, in order for the particular multi-taken sequence to be predicted again, the multi-taken sequence needs to then be observed an increased number of times for the confidence level to be increased high enough that the threshold is satisfied.

By employing this system of tracking a confidence level and a threshold, the prediction confidence calculation circuitry can allow the prediction circuitry to make predictions in respect of multi-taken sequences, including multi-taken sequences that do not exhibit static behaviour whilst maintaining a high level of accuracy of prediction.

The prediction confidence information may be stored in any suitable structure, for example, dedicated circuitry may be provided for storing the prediction confidence information or existing circuitry already provided for another purpose (e.g., existing branch prediction structures) may be used to store this information. Similarly, a range of possible formats for the confidence information could be used, however, in some examples the confidence information is arranged into entries with each entry corresponding to a particular multi-taken sequence. These entries may be tagged by the address of the first control flow changing instruction such that the entry for a particular multi-taken sequence can be easily identified based on the first control flow changing instruction to which the multi-taken sequence relates.

However, in some examples, the prediction circuitry is arranged to operate on predict blocks comprising a plurality of instructions at a time. Specifically, the prediction circuitry may be arranged to make predictions in respect of each predict block rather on a per-instruction level. For example, the prediction circuitry may predict that a control flow changing instruction will be taken from a particular predict block to another predict block, without explicitly identifying which instruction in the particular predict block causes the change in control flow. In such a case, the confidence information may be tagged by an address for the predict block containing the first control flow changing instruction which may not be the address of the first control flow changing instruction itself. The confidence information therefore provides a confidence that a multi-taken sequence having as its first control flow changing instruction any of the instructions in the predict block will be taken.

In addition to or instead of the prediction confidence calculation circuitry maintaining confidence information that is referenced to determine whether the prediction circuitry should be allowed to make predictions in respect of a particular multi-taken sequence, other sources of information indicative of the confidence that a particular multi-taken sequence will be correctly predicted may be used. One such source that may already be maintained in a processor is tagged geometric history length (TAGE) prediction circuitry. The TAGE prediction circuitry implements a form of branch direction predictor referred to as a TAGE branch predictor. The TAGE prediction circuitry may be provided as a branch direction predictor to predict whether conditional control flow changing instructions will be taken or not taken. The TAGE prediction circuitry itself is not adapted to predict multi-taken sequences but rather the direction of single control flow changing instructions. The TAGE prediction circuitry comprises a plurality of TAGE tables, each tagged by an indication of the execution history leading to the control flow changing instruction, with those indications representing a different length of execution history for the different TAGE tables. In order to track in which of those tables a hit needs to be detected for a given control flow changing instruction for a prediction to be made on the basis of the information stored in the TAGE tables, the prediction circuitry maintains a TAGE class value. For control flow changing instructions that are expected to be predicted with a high degree of confidence, the TAGE class value will be small such that only a small number of the TAGE tables (corresponding to shorter execution history length) need to have a hit detected for a prediction. Conversely, control flow changing instructions the direction of which is less certain will have a higher TAGE class value indicating that a hit needs to be detected in more TAGE tables (and so execution history having a longer length needs to match) for the prediction to be made.

Thus, the prediction confidence calculation circuitry, as well as using this TAGE class value for controlling prediction made using the TAGE prediction circuitry, may use the TAGE class value to control whether predictions can be made for multi-taken sequences. Specifically, the prediction confidence calculation circuitry may be configured to use, as the confidence level, the TAGE class value. It may determine that the prediction confidence condition is satisfied for a particular multi-taken sequence when the TAGE class value for the second control flow changing instruction of the particular multi-taken sequence satisfies a predetermined threshed. In this case, the predetermined threshold may be satisfied when the TAGE class value falls below, or is less than or equal to the predetermined threshold.

As part of the prediction confidence condition, the prediction calculation circuitry may also require that a hit is detected in the highest TAGE table (the table corresponding to the shortest length of execution history) for the second control flow changing instruction. This may be done to ensure that not only does the TAGE prediction circuitry indicate a high level of stability in the direction of the control flow changing instruction, but also that in the case where the multi-taken sequence is being predicted, the TAGE prediction circuitry will in fact predict the second control flow changing instruction as being taken.

By making use of the TAGE prediction circuitry in this way, the apparatus can take advantage of structures that may already be provided in a processor for tracking the confidence that a branch will be taken. Thus, the accuracy of prediction of multi-taken sequences can be improved for limited cost in terms of power and chip area required to track such information. The TAGE class value may be used in combination with the confidence level tracked using the confidence information such that the prediction confidence condition is satisfied when either of the TAGE class value satisfies its predetermined threshold or when the confidence information indicates a high level of confidence in a particular prediction. In some examples however, each of the TAGE class value satisfying the predetermined threshold, a hit being detected in the highest TAGE table, and the confidence information indicating that the multi-taken sequence will be taken is needed in order for the prediction confidence calculation circuitry to allow the prediction circuitry to predict the multi-taken sequence.

To track the multi-taken sequences that are allowed to be predicted by the prediction circuitry, the apparatus may be provided with target prediction storage to store indications of multi-taken sequences. The prediction circuitry may then reference the target prediction storage in order to predict multi-taken sequences. For example, the prediction circuitry, on encountering a particular control flow changing instruction or a particular predict block may reference the target prediction storage to determine whether an entry is stored in the target prediction storage identifying a multi-taken sequence beginning with that control flow changing instruction or predict block. If there is such an entry, the prediction circuity may then predict the multi-taken sequence. In some examples, the prediction circuitry is configured to predict the multi-taken sequence on identifying a relevant multi-taken sequence in the target prediction storage, however, in some examples, the prediction circuitry may also consider the output of branch direction prediction circuitry that predicts whether a control flow changing instruction will be taken or not. Thus, the prediction circuitry may only predict the multi-taken sequence when the target prediction storage stores an indication of the multi-taken sequence and the branch direction prediction circuitry indicates that the first control flow changing instruction of a multi-taken sequence will be taken. In some examples, the target prediction storage comprises a plurality of entries used to indicate multi-taken sequences. These entries may include a valid indicator to indicate whether the information stored in the entry is valid and so allowed to be used to predict a multi-taken sequence. Thus, the prediction circuitry may also be configured to reference the valid indicator and only predict the multi-taken sequence when the valid indicator indicates that the entry is valid.

To allow or prevent a particular multi-taken sequence being predicted by the prediction circuitry, the prediction confidence calculation circuitry may control the information stored in the target prediction circuitry. To allow the prediction circuitry to predict a particular multi-taken sequence, the prediction confidence calculation circuitry may store an indication of the particular multi-taken sequence in the target prediction storage thereby allowing the prediction circuitry to identify the particular multi-taken sequence when making predictions.

Conversely, to prevent the prediction circuitry predicting a particular multi-taken sequence, the prediction confidence calculation circuitry may, if an indication of the particular multi-taken sequence is not already stored in the target prediction storage, prevent such an indication being stored. However, if an indication of the particular multi-taken sequence is already stored in the target prediction storage, the prediction confidence calculation circuitry may invalidate the entry or entries in which the indication is stored. This may for example be achieved by setting the valid indicator associated with the entry or entries to mark the multi-taken sequence as invalid.

The target prediction storage could take a number of forms. For example, dedicated target prediction storage may be provided specifically for storing indications of multi-taken sequences. In some examples however, to avoid providing such dedicated circuitry, existing target prediction storage in the form of a branch target buffer (BTB) may be used to store the indications of the multi-taken sequences. In this case, the BTB may already be configured to store information identifying target addresses for control flow changing instructions that are predicted as taken and used by the prediction circuitry for predicting individual control flow changing instructions (i.e., not multi-taken sequences). However, this storage may also be used to store indications of multi-taken sequences. To store the additional information that may be needed to properly identify a multi-taken sequence, the target prediction storage may be configured to use two or more entries, each of which would otherwise store information for a single control flow changing instruction.

To reduce the space occupied in the target prediction storage, whether dedicated target prediction storage or the BTB are used, the target prediction storage may be configured to store the multi-taken sequences in a compressed form. This therefore allows the target prediction storage to store more indications of multi-taken sequences. One approach by which the indications of multi-taken sequences could be compressed is by storing an indication of the target address of the first control flow changing instruction (i.e., an indication the start of the series of instructions or the predict block to which flow is diverted by the first control flow changing instruction) and an indication of the target address of the multi-taken sequence (i.e., an indication of the instruction or predict block to which control flow is diverted by the second control flow changing instruction) as an offset from the address of the first control flow changing instruction (or the predict block containing the first control flow changing instruction). Therefore, rather than storing the full address of the target addresses, only the offsets may be stored which may reduce the space occupied by an entry in the target prediction storage. In some cases, only a limited amount of space (e.g., a certain number of bits) may be allocated for storing the offsets. When attempting to compress indications of multi-taken sequences for which the offsets would be too large to store in the allocated space (e.g., would need more bits to store the offset than are allocated), the prediction confidence calculation circuitry may be arranged to drop such multi-taken sequences. Thus, it does not allow the multi-taken sequence to be predicted, but it allows the indications of multi-taken sequences to be stored in compressed form for the multi-taken sequences that can be represented this way.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define an HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, or using a including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Particular examples will now be described with reference to the figures.

FIG. 1 is a schematic illustrating an apparatus 2 in accordance with an example implementation. The apparatus 2 implements branch prediction to populate a fetch queue 10 (also referred to as a prediction address queue) with instruction addresses that are used to fetch instructions for execution by one or more execution units of the apparatus 2. Those addresses can be routed to an instruction cache (not shown) that retrieves the instructions at the identified addresses (if a hit is detected in the instruction cache for an input address, then the instruction can be output directly from the instruction cache, whereas otherwise the instruction can be requested from a lower level of a memory hierarchy forming the memory system and, when retrieved, can be output from the instruction cache). The fetched instructions are then forwarded to an instruction decoder where they are decoded in order to produce control signals used to control the operation of the execution units so as to implement the operations required by those instructions.

The apparatus 2 may be arranged during each prediction iteration to consider a predict block of instructions, where the predict block comprises a plurality of sequential instructions within the memory address space. The predict block may for example be identified by a start address identifying the first instruction address within the predict block, and the size of the predict block will typically be predetermined. For example, a 32 byte predict block may be considered in each prediction iteration, and in one particular implementation each instruction may have an instruction address formed of 4 bytes, such that each predict block represents eight instructions at sequential addresses in memory.

Each predict block predicted by the apparatus 2 is added into the fetch queue 10, whilst also being provided to various branch prediction mechanisms within the apparatus 2. The aim of the apparatus 2 is to predict whether any instructions identified by the predict block are control flow changing instructions that are predicted as taken. In the event that the predict block includes one or more of such instructions, then the location of the first control flow changing instruction that is predicted as taken is identified, and the target address of that control flow changing instruction is used to identify the start address for the next predict block. If no such control flow changing instructions are identified within the predict block, then the start address for the next predict block is merely the sequential address following the last address of the current predict block. When the branch predictor 10 predicts that a predict block does include a control flow changing instruction that is predicted as taken, then the position of that control flow changing instruction is used to modify the content of the predict block as added into the fetch queue 10. For example, if it is determined that the fourth instruction in the sequence of eight identified by a predict block is predicted as taken, then the final four instructions will be discarded from the sequence of instructions identified within the fetch queue 10, so that those later instructions are not fetched for execution by the execution circuitry, and instead the next instruction fetched after the fourth instruction in that predict block will be the instruction at the predicted target address for the control flow changing instruction (i.e. the first instruction in the next predict block).

The apparatus 2 can include a number of branch prediction components. As shown in FIG. 1, a branch direction predictor 46 can be used for seeking to predict whether a conditional control flow changing instruction will be taken or not taken. If a control flow changing instruction is not taken, then the next instruction to be executed will be the instruction immediately following that instruction flow changing instruction in the instruction address space. However, if the instruction flow changing instruction is predicted as taken, then a determination of the target address for that instruction is required, as the next instruction that will be predicted to be executed will be the instruction at that target address.

To assist in the prediction of target addresses, one or more branch target buffer (BTB) structures may be provided. For example, as illustrated in FIG. 1, a BTB 42 is provided for making a prediction of the target address of a control flow changing instruction that is predicted as taken. Hereafter, any control flow changing instruction. Hence, for a control flow changing instruction that is predicted as taken, the BTB 42 can be used to assist in the determination of a target address for that control flow changing instruction. In particular, an entry may be provided for that control flow changing instruction, and may include information that is used to determine a predicted target address. That predicted target address may be encoded directly within the entry of the BTB, or alternatively a further target prediction structure may be referenced in order to predict the target address. For example, if the BTB 42 identifies that the branch instruction is a function return instruction, then the target address itself may not be identified within the BTB entry, but instead a return stack structure will be referred to in order to obtain the predicted target address.

The throughput of the apparatus 2 can effectively represent a bottleneck within the system. In particular, the fetch queue 10 may be able to receive multiple blocks of instructions in a single cycle, but the apparatus 2 itself may only be able to receive and process a single block of instructions in one cycle. In accordance with the techniques described herein, a mechanism is provided that enables multi-taken sequences to be populated in target prediction storage (either the BTB 42 or separately provided multi-taken sequence target prediction storage 44) to enable two blocks of instructions to be added into the fetch queue 10 in a single cycle.

To support this behaviour and so as to maintain the accuracy of prediction, prediction confidence calculation circuitry 30 is provided to monitor confidence levels associated with a plurality of multi-taken sequences in order to control in respect of which multi-taken sequences predictions should be allowed to be made.

In accordance with the techniques described herein, the prediction confidence calculation circuitry 30 maintains confidence information stored in confidence information storage circuitry 32 to identify multi-taken sequences and maintain an associated confidence level associated with such sequences. Based on execution information from execution circuitry (which may include instances of misprediction where a multi-taken sequence was incorrectly predicted, and observed sequences of instructions where multi-taken sequences are either taken or not taken), the prediction confidence calculation circuitry 30 updates the confidence information in the confidence information storage circuitry 32 to represent any resulting changes in the confidence levels.

Based on the confidence levels for the multi-taken sequences, the prediction confidence circuitry populates and invalidates entries in the target prediction storage for multi-taken sequences (which may be implemented as dedicated multi-taken sequence target prediction storage 44 or may be implemented as part of the BTB 42).

Prediction circuitry 20 is provided to make determinations, based on the prediction components (including the BTB 42, the multi-taken sequence target prediction storage 44 if provided, and the branch direction predictor 46) about which predictions should be made and so how to populate the fetch queue 10. Hence, by altering which indications of multi-taken sequences are stored in the target prediction storage 42, 44, the prediction confidence calculation circuitry is able to control whether the prediction circuitry 20 is allowed to predict particular multi-taken sequences.

In this way, the prediction confidence calculation circuitry 30 is able to allow the prediction circuitry 20 to make predictions of multi-taken sequences, even when it is not known for certain whether the multi-taken sequence will turn out to be executed as predicted, whilst maintaining a high level of accuracy so as to reduce the incidence of mispredictions.

Figure 2:
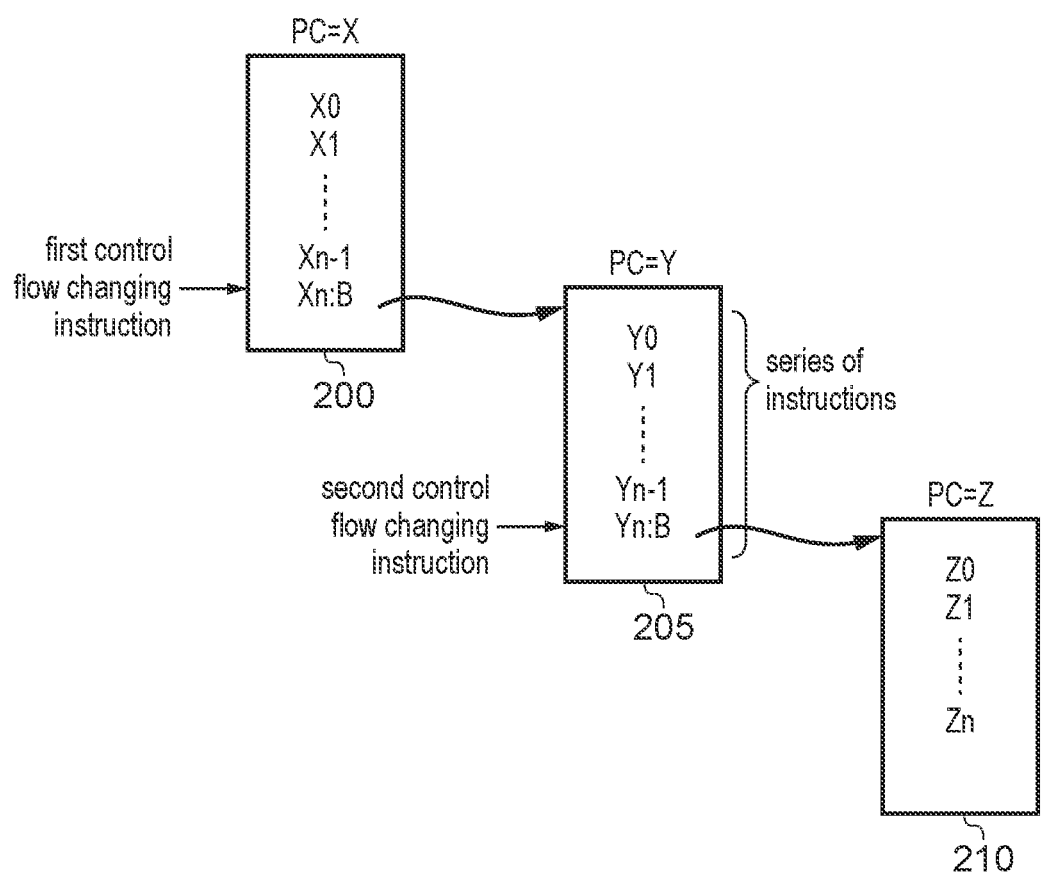
FIG. 2 schematically illustrates a multi-taken sequence.

FIG. 2 schematically illustrates an example multi-taken sequence of the form that may be predicted using the apparatus 2 of FIG. 1. In this instance, a first predict block X 200 is assumed to contain a control flow changing instruction, having address Xn, that is predicted as taken and that results in the identification of a target address identifying the next predict block Y 205. This second predict block Y terminates with a control flow changing instruction that branches to the predict block Z 210. In such situations, it has been found possible to create an entry within target prediction circuitry 42, 44 that identifies as a first control flow changing instruction the branch instruction within the predict block X 200, along with an indication of the associated target address Y0, and in addition captures sufficient information about the predict block Y 205 and the resulting target address Z0 to enable both the predict blocks Y 205 and Z 210 to be added directly into the fetch queue, but with the next prediction iteration starting with the predict block Z 210.

Control flow changing instructions can be categorised into two types, namely those exhibiting dynamic behaviour and those exhibiting static behaviour. Dynamic behaviour instructions change their behaviour dependent on the status of the processor executing those instructions. Hence, dynamic control flow changing instructions include any form of conditional branch instruction, since a direction prediction is required in order to determine whether the branch will be taken or not taken, and typically an assessment of certain condition flags of the processor is required in order to determine whether the control flow changing instruction will be taken or not. As another example of a dynamic behaviour branch instruction, polymorphic indirect branches will also be considered to exhibit dynamic behaviour, since typically the target address will depend on the contents of at least one general purpose register, and those contents will vary between instances where that indirect branch instruction is executed.

Static behaviour branch instructions are then the remaining branch types. Hence, any unconditional direct control flow changing instruction will be considered to exhibit static behaviour, since it will always be taken, and the target address can be determined directly from the branch instruction itself, and hence does not vary each time the unconditional direct branch instruction is executed. Also, for the purposes of the techniques described herein, unconditional function return instructions can be considered to exhibit static behaviour since, despite the fact that the target address can vary (for example due to different function call instructions being associated with the same function return instruction), the target address is predictable in that it can be obtained from a return stack structure.

According to an approach to predicting multi-taken sequences, only multi-taken sequences exhibiting static behaviour, (i.e., for which the second control flow changing instruction has static behaviour and none of the series of instructions occurring earlier in the predict block Y 205 than the second control flow changing instruction Yn are control flow changing instructions) are predicted. This may be done to ensure accuracy of prediction since if the first control flow changing instruction is correctly predicted (e.g., using existing prediction structures) it will be known that the multi-taken sequence will proceed as predicted.

However, in accordance with the techniques described herein, as well as predicting multi-taken sequences that exhibit static behaviour, multi-taken sequences that exhibit dynamic behaviour can be predicted. Thus, multi-taken sequences having as their second control flow changing instruction a conditional control flow changing instruction and multi-taken sequences having additional control flow changing instructions in the series of instructions can be predicted. This can therefore increase the rate at which predictions can be made, with the prediction confidence calculation circuitry 30 operating to ensure that a desired level of prediction accuracy is maintained.

FIGS. 3A-3C illustrate example entries in target prediction storage 42, 44.

FIG. 3A illustrates a target prediction entry 300 used to store an indication of a multi-taken sequence for reference by the prediction circuitry 20. As illustrated, the entry comprises an address indication of a first control flow changing instruction to identify the address of either a first control flow changing instruction or a predict block containing such a first control flow changing instruction. The entry 300 also identifies a target of the first control flow changing instruction 304 and a target of the second control flow changing instruction 306. Based on this information, the prediction circuitry 20 can cause the predict blocks containing the targets of the first and second control flow changing instructions respectively to be identified in the fetch queue 10. The target prediction entry 300 also comprises a valid indicator 308 to indicate whether the target prediction entry 300 is a valid entry upon which a prediction can be based. This may be implemented as a single bit having a first value (e.g., zero) to indicate that the entry is valid and can be used by the prediction circuitry 20 to make predictions and a second value (e.g., one) to indicate that the entry is invalid and so should not be used as the basis of predictions. Thus, to prevent the multi-taken sequence being predicted by the prediction circuitry 20, the prediction confidence calculation circuitry 30 can set the valid indicator to the second value, thereby preventing the multi-taken sequence associated with the entry 300 being predicted.

FIG. 3B illustrates a target prediction entry in which the target of the first flow changing instruction and the target of second control flow changing instruction (whether considered as the addresses of the instructions themselves or the predict blocks) are expressed as offsets. That is, whilst the address indication of the first control flow changing instruction 312 is expressed in the same way as for target prediction entry 300, to indicate the target of the first control flow changing instruction, only the offset 314 between the first control flow changing instruction and its target is used. Similarly, the target of the second control flow changing instruction is indicated as an offset 316 from either the address of the first control flow changing instruction or the target of the first control flow changing instruction. The entry 310 also has a valid indicator 318 as described above for the entry 300. The representation of the addresses as offsets in this way may reduce the space needed for the target prediction entry and therefore allow less space to be occupied to store the entries and/or more entries to be stored.

FIG. 3C illustrates an example of how a target prediction entry 320 may be stored in a BTB adapted for storing the targets of single control flow changing instructions. As illustrated, two entries are used in the BTB where each entry would otherwise store the target of a single control flow changing instruction. To distinguish between standard entries in the BTB and pairs 330, 340 of BTB entries that together represent a single multi-taken sequence entry 320, the entry 320 comprises a multi-taken sequence indicator 321. The multi-taken sequence indicator 321 may indicate to the prediction circuitry 20 that the two following entries 330, 340 in the BTB are to be interpreted together as a single multi-taken sequence entry. Stored across the two entries in the BTB 330, 340 are then included an address indication of the first control flow changing instruction 322, a target of the first control flow changing instruction 324 (which may be expressed as an offset or as the address itself), a target of the second control flow changing instruction 326 and a valid indicator 328.

Figure 4:
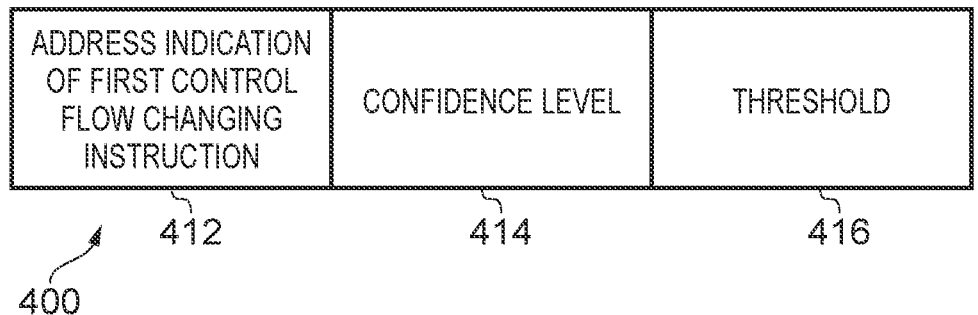
FIG. 4 illustrates an example entry in confidence information storage.

FIG. 4 illustrates an example entry 400 in confidence information storage circuitry 32. In accordance with this example, the confidence information storage circuitry 32 stores confidence information for each of a plurality of multi-taken sequences. This information is then maintained by the prediction confidence calculation circuitry 30 for use in determining whether to allow the prediction circuitry 20 to make predictions in respect of a particular multi-taken sequence.

The confidence information storage entry 400 includes information for identifying the multi-taken sequence to which the entry 400 relates. As shown in FIG. 4, this takes the form of an address indication of the first control flow changing instruction 412 (e.g., an address of the instruction or an address of the predict block containing the instruction). The confidence information also includes a confidence level 414 and a threshold 416. Thus, to evaluate whether the prediction confidence condition is satisfied, the prediction confidence calculation circuitry 30 can compare the confidence level 414 for a particular multi-taken sequence with a threshold 416 for the sequence. If the confidence level 414 satisfies the threshold 416 (which in this case is when the confidence level 414 is greater than or equal to the threshold 416), the prediction confidence calculation circuitry 30 allows the prediction circuitry 20 to predict the multi-taken sequence and so stores an indication of the multi-taken sequence in the target prediction storage 42, 44.

Figure 5:
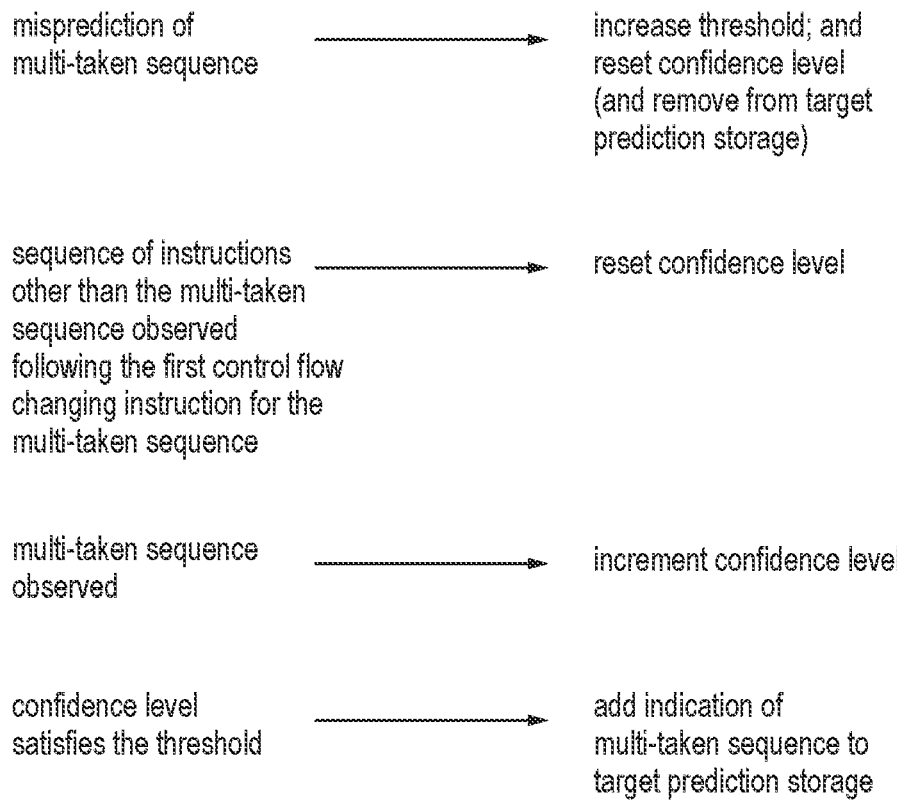
FIG. 5 illustrates example operations of the prediction confidence calculation circuitry in response to various events.

FIG. 5 illustrates how the confidence information storage entry 400 of FIG. 4 is updated in response to various events so that the confidence level reflects the confidence that the multi-taken sequence can be predicted correctly.

If misprediction of the multi-taken sequence is observed by virtue of the prediction circuitry 20 having predicted the multi-taken sequence but the execution circuitry executing the instructions does not execute the multi-take sequence in its entirety, this may be an indication that the threshold is set too low and so the threshold should be increased. In this example, the threshold indication 416 is implemented as a two bit value, with the actual threshold that the confidence level 414 has to reach to satisfy the threshold doubling with each increase in the threshold indication 416. With the threshold being set at 64 for a threshold indication of 0b00, the threshold can therefore be increased to 128 for a threshold indication of 0b01, 256 for 0b10 and 512 for 0b11 each time a misprediction is detected in respect of that multi-taken sequence.

As well as increasing the threshold in this case, if a misprediction is detected, the confidence level 414 is reset to a default value (e.g., zero) and the prediction circuitry 20 is prevented from predicting the multi-taken sequence by removing or invalidating the entry in the target prediction storage 42, 44 for the multi-taken sequence.

Next, if a sequence of instructions is observed containing the first control flow changing instruction of a particular multi-taken sequence but which does not follow the multi-taken sequence (e.g., because the second control flow changing instruction is not taken or an intervening control flow changing instruction in the series of instructions is taken) then the confidence level is reset to its default value (e.g., zero). Hence, even if no misprediction has occurred since the multi-taken sequence was not predicted, the prediction confidence calculation circuitry may reflect a perceived drop in confidence by virtue of this being detected.

On the other hand, if a multi-taken sequence is observed as being either predicted or executed, the confidence level for that multi-taken sequence can be incremented.

Then when the multi-taken sequence has been observed sufficient times simultaneously that the confidence level satisfies the threshold, the prediction confidence calculation circuitry may allow the prediction circuitry 20 to predict that multi-taken sequence and add that multi-taken sequence to the target prediction storage 42, 44.

Figure 6:
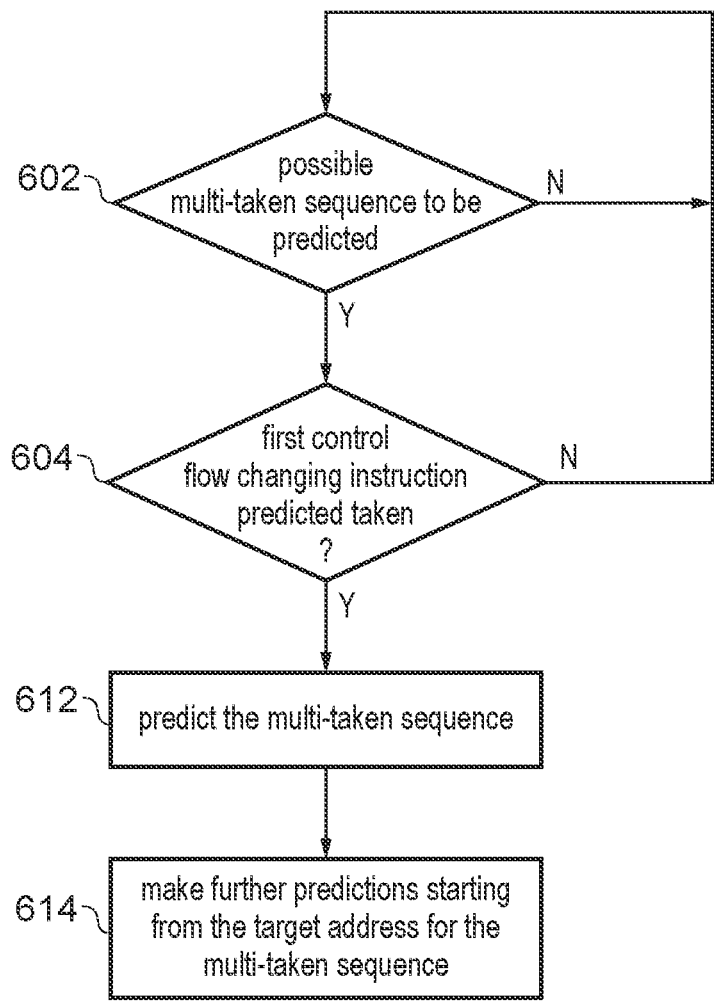
FIG. 6 is a flowchart illustrating example operation of the apparatus of FIG. 1.

FIG. 6 is a flowchart illustrating example operation of the prediction circuitry 20 in determining whether to predict a particular multi-taken sequence. At step 602, the prediction circuitry 20 determines whether the predict block being considered contains a candidate multi-taken sequence. This may be determined with reference to the target prediction storage 42, 44 such that a possible multi-taken sequence is identified if there is a multi-taken sequence entry in the target predict block for the predict block.

Next, at step 604, the prediction circuitry 20 determines whether the first control flow changing instruction 604 is predicted as being taken. This may be a trivial determination if the first control flow changing instruction exhibits static behaviour and so is always taken or may involve reference to the branch direction predictor 46.

If the first control flow changing instruction is not predicted as being taken, the multi-taken sequence is not predicted, however, if the first control flow changing instruction is predicted as being taken, then the prediction circuitry 20 predicts the multi-taken sequence at step 612 and begins making further predictions starting from the target address for the multi-taken sequence at step 614.

Figure 7A:
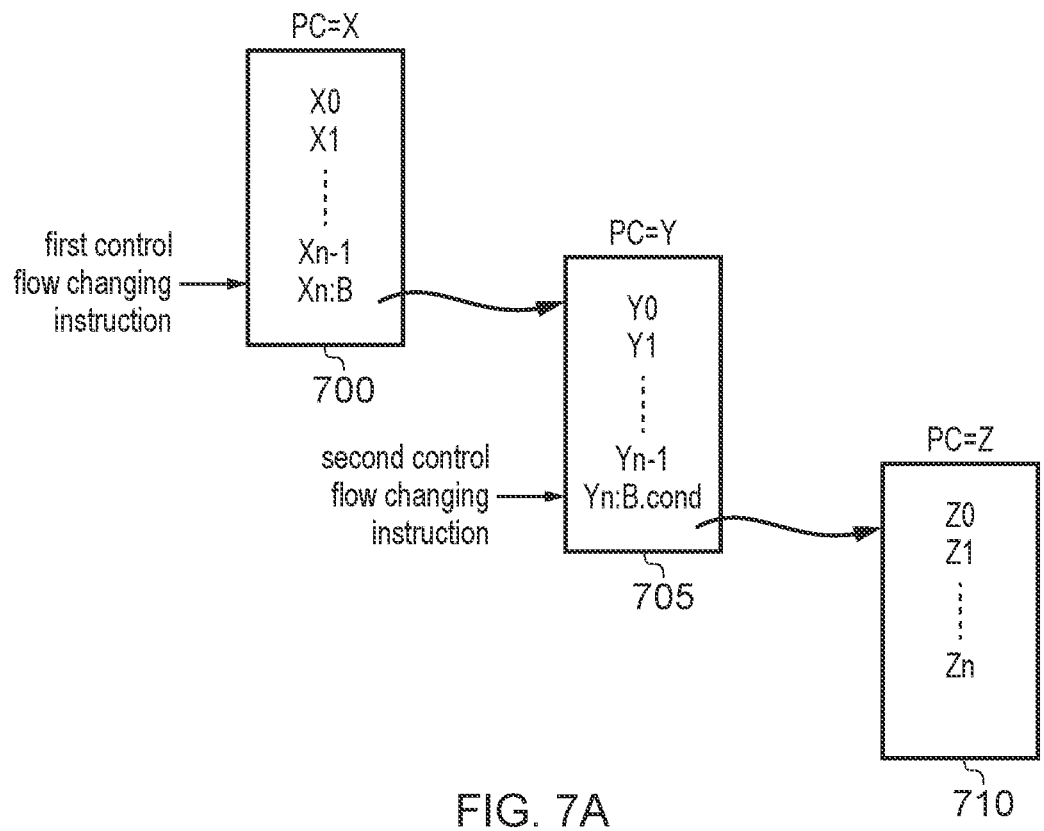
FIGS. 7A-7C illustrate multi-taken sequences that may be predicted using the apparatus of FIG. 1.
Figure 7B:
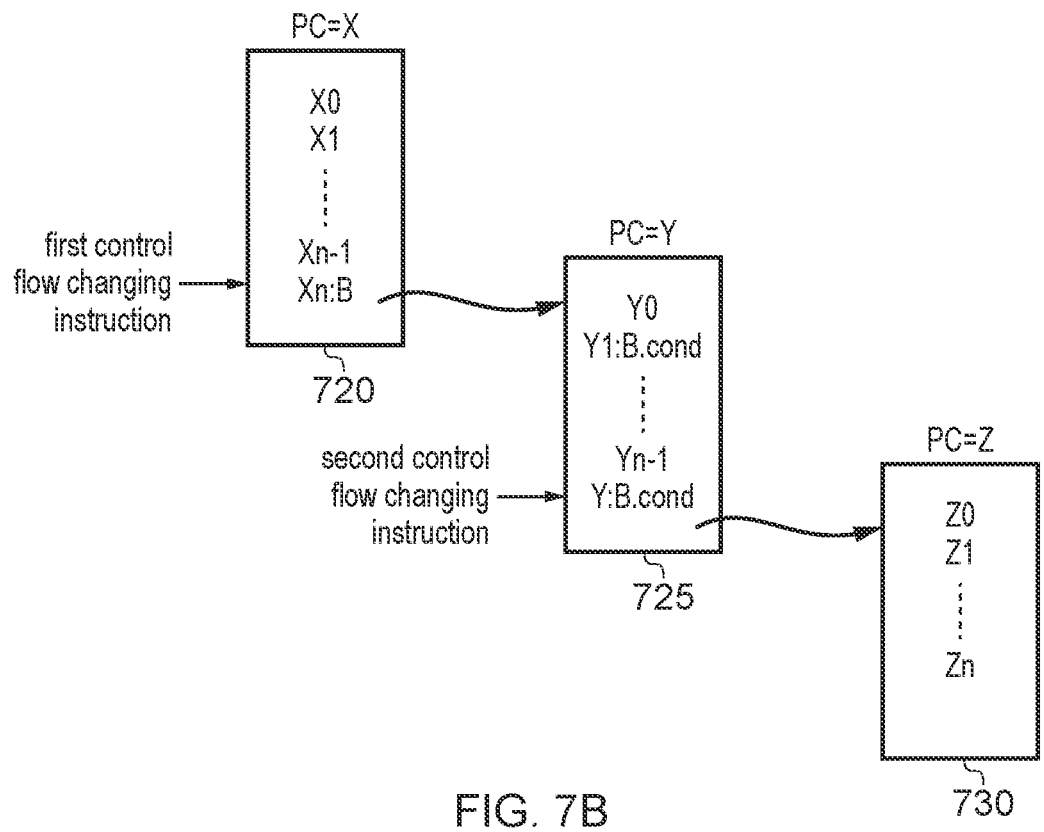
Figure 7C:
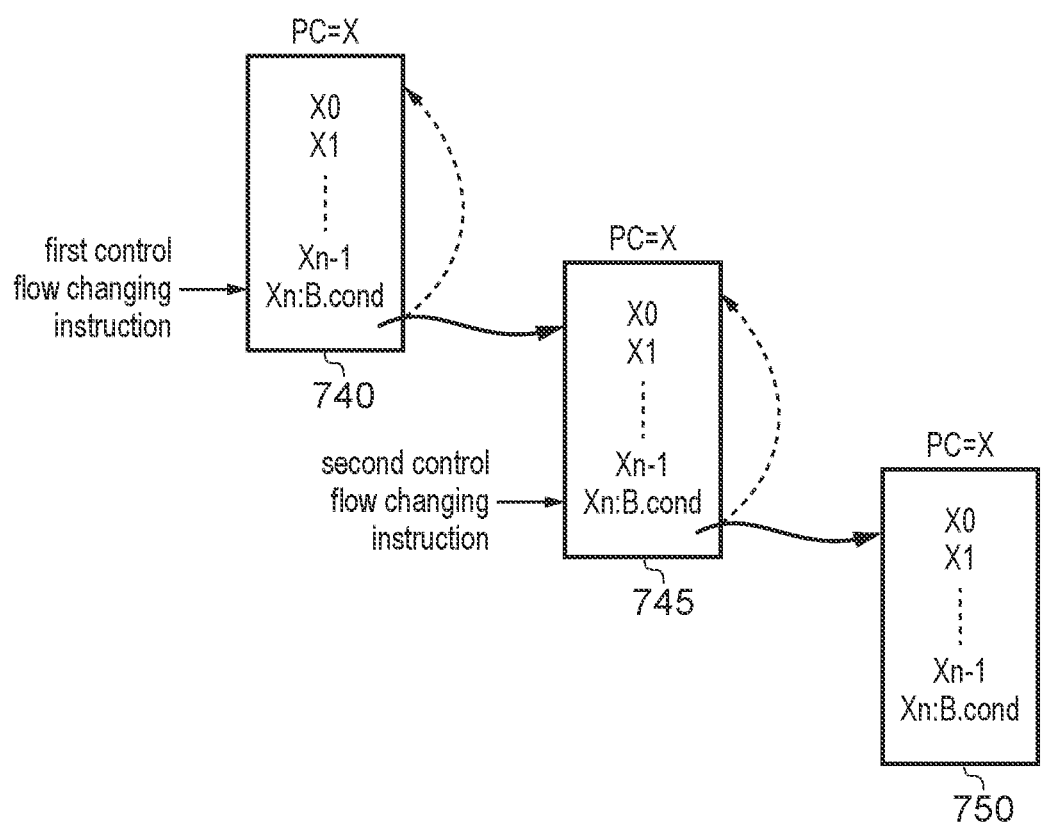

FIGS. 7A-7C illustrate multi-taken sequences that may be predicted. FIGS. 7A-7C represent variations of FIG. 2 and so common features with FIG. 2 will not be discussed in detail again here.

FIG. 7A shows an example of a multi-taken sequence in which the second control flow changing instruction (having address Yn) is a conditional control flow changing instruction. Thus, at the time of making the prediction, it is not known for certain whether the control flow changing instruction will turn out to be taken. However, based on the confidence levels, the prediction circuitry 20 may nevertheless predict the multi-taken sequence and so fetch both predict blocks Y 705 and Z 710.

FIG. 7B shows an example of a multi-taken sequence in which there is an intervening control flow changing instruction in the series of instructions in predict block Y 725. Again, the presence of this control flow changing instruction leads to some uncertainty as to whether the multi-taken sequence will be executed. However, such a sequence can still be predicted using the present techniques since the confidence level will reflect the confidence in the intervening instruction at Y1 not being taken.

FIG. 7C shows an example of a multi-taken sequence involving a loop confined to a predict block. As shown, the predict block X contains an instruction Xn that causes control flow to branch to the start of the predict block. Thus, in accordance with the techniques described herein, the prediction circuitry 20 can predict not only the first branch to the start of the predict block but also the subsequent iteration of the branch to the start of the predict block. In this way, the prediction circuitry 20 can predict ahead in the loop more quickly than could otherwise be achieved if only a single prediction were being made at a time. Code involving loops confined to a single predict block in this way are particularly prevalent in code compiled using GNU Compiler Collection (GCC).

Further example arrangements are set out below:

Example 1. An apparatus comprising:
a fetch queue to identify a sequence of instructions to be fetched for execution;
prediction circuitry to predict upcoming control flow and to control which instructions are identified in the fetch queue in dependence on the prediction,
wherein the prediction circuitry is operable to predict multi-taken sequences, wherein a multi-taken sequence is a sequence of instructions in which control flow is diverted by a first control flow changing instruction to a series of instructions terminating in a second control flow changing instruction that diverts control flow to a target address; and
prediction confidence calculation circuitry to calculate confidence levels for respective multi-taken sequences, each said confidence level being indicative of a confidence in an accuracy of prediction of its respective multi-taken sequence, wherein the prediction confidence tracking circuitry is configured to allow, when the confidence level for a particular multi-taken sequence satisfies a prediction confidence condition, the particular multi-taken sequence to be predicted by the prediction circuitry,
wherein the prediction circuitry is configured to cause, when the prediction circuitry predicts the particular multi-taken sequence, the series of instructions and the target instruction for the particular multi-taken sequence to be identified in the fetch queue and to begin making further predictions starting from the target address for the particular multi-taken sequence.

Example 2. The apparatus according to example 1, wherein:
the prediction circuitry is operable to predict conditional multi-taken sequences for which the second control flow changing instruction is a conditional control flow changing instruction; and
the prediction confidence calculation circuitry is configured to calculate the confidence level for a given conditional multi-taken sequence based at least in part on a confidence that the second control flow changing instruction of the given conditional multi-taken sequence will be taken.

Example 3. The apparatus according to example 1 or example 2, wherein:
the prediction confidence calculation circuitry is configured to calculate the confidence level for a given multi-taken sequence based at least in part on a confidence that any conditional control flow changing instructions occurring in the series of instructions before the second control flow changing instruction will not be taken.

Example 4. The apparatus according to any preceding example, wherein:
the prediction circuitry is operable to predict sure multi-taken sequences for which the second control flow changing instruction is unconditionally taken and for which the series of instructions is absent any other control flow changing instructions; and
the prediction confidence calculation circuitry is configured to allow the prediction circuitry to predict the sure multi-taken sequences without calculating a confidence level for the sure multi-taken sequences.

Example 5. The apparatus according to any preceding example, wherein:
when the confidence level for the particular multi-taken sequence does not satisfy the prediction confidence condition, the prediction confidence calculation circuitry is configured to prevent the prediction circuitry predicting the particular multi-taken sequence.

Example 6. The apparatus according to any preceding example, wherein the prediction confidence calculation circuitry is configured to:
detect a confidence lowering event in respect of a given multi-taken sequence; and
in response to detecting the confidence lowering event, prevent the prediction circuitry predicting the given multi-taken sequence.

Example 7. The apparatus according to example 6, wherein:
the prediction confidence calculation circuitry is configured to detect the confidence lowering event when a misprediction occurs using the given multi-taken sequence.

Example 8. The apparatus according to example 6 or example 7, wherein:
the prediction confidence calculation circuitry is configured to detect the confidence lowering event when a sequence of instructions other than the given multi-taken sequence is observed following the first control flow changing instruction for the given multi-taken sequence.

Example 9. The apparatus according to any preceding example, further comprising:
confidence information storage circuitry to store confidence information maintained by the prediction confidence calculation circuitry;
wherein the prediction confidence calculation circuitry is configured to reference the confidence information to determine, for the particular multi-taken sequence, whether the prediction confidence condition is satisfied.

Example 10. The apparatus according to example 9, wherein:
the confidence information storage circuitry is arranged to store confidence information indicative of a confidence level and a threshold for each of a plurality of multi-taken sequences; and
the prediction confidence calculation circuitry is configured to determine that the prediction confidence condition is satisfied when the confidence level for the particular multi-taken sequence satisfies the threshold.

Example 11. The apparatus according to example 10, wherein:
the prediction confidence calculation circuitry is configured to increase the confidence level for the particular multi-taken sequence when the particular multi-taken sequence is observed and to reset the confidence level when either a sequence of instructions other than the particular multi-taken sequence is observed following the first control flow changing instruction or a misprediction occurs using the particular multi-taken sequence.

Example 12. The apparatus according to example 11, wherein:
the particular multi-taken sequence is observed when the prediction circuitry predicts the sequence of instructions corresponding to the particular multi-taken sequence.

Example 13. The apparatus according to example 11 or example 12, wherein:
the prediction confidence calculation circuitry is configured to increase the threshold for the particular multi-taken sequence when a misprediction occurs using the particular multi-taken sequence.

Example 14. The apparatus according to any of examples 9-13, wherein:
the confidence information is tagged by the address of the first control flow changing instruction.

Example 15. The apparatus according to any of examples 9-14, wherein:
the prediction circuitry operates on predict blocks, each predict block comprising a plurality of instructions;
the confidence information is tagged by an address for the predict block wherein the confidence information for each predict block is indicative of a confidence that a multi-taken sequence having, as its first flow control changing instruction, any of the instructions in the plurality of instructions will be taken.

Example 16. The apparatus according to any preceding example, further comprising:
tagged geometric history length (TAGE) prediction circuitry to predict whether conditional control flow changing instructions will be taken or not taken based on a plurality of TAGE tables tagged by a range of lengths of execution history;
wherein the prediction circuitry is configured to maintain a TAGE class value for the conditional control flow changing instructions indicative of a number of the plurality of TAGE tables in which a hit needs to be detected for a prediction to be made based on the TAGE prediction circuitry; and
the prediction confidence calculation circuitry is configured to use, as the confidence level, the TAGE class value and to determine that the prediction confidence condition is satisfied when the TAGE class value satisfies a predetermined threshold.

Example 17. The apparatus according to example 16, wherein:
the prediction confidence calculation circuitry is additionally configured to determine that the prediction confidence condition is satisfied based on the detecting a hit in the highest TAGE table of the plurality of TAGE tables, the highest TAGE table being the TAGE table tagged by the shortest length of execution history.

Example 18. The apparatus according to any preceding example, wherein:
the prediction circuitry is configured to make, when predicting a multi-taken sequence, the predictions in respect of the first control flow changing instruction and the second control flow changing instruction in the same clock cycle.

Example 19. The apparatus according to any preceding example, further comprising:
target prediction storage having a plurality of entries that are used to indicate multi-taken sequences;
wherein the prediction circuitry is configured to reference the target prediction storage to predict the multi-taken sequences; and
to allow the prediction circuitry to predict the particular multi-taken sequence, the prediction confidence calculation circuitry is configured to store, in the target prediction storage, an indication of the particular multi-taken sequence.

Example 20. The apparatus according to example 19, wherein:
to prevent the prediction circuitry predicting a particular multi-taken sequence, the prediction confidence calculation circuitry is configured to prevent the indication of the particular multi-taken being stored in the target prediction storage or to invalidate at least one entry in the target prediction storage in which the indication of the particular multi-taken sequence is stored.

Example 21. The apparatus according to example 19 or example 20, wherein:
the target prediction storage is configured to store information identifying target addresses for control flow changing instructions that are predicted as taken; and
the target prediction storage is configured to use two or more entries to store a given multi-taken sequence.

Example 22. The apparatus according to any of examples 19-21, wherein:
the target prediction storage is configured to store the multi-taken sequences in a compressed form by storing at least an indication of a target address of the first control flow changing instruction and the target address of the multi-taken sequence as an offset from an address of the first control flow changing instruction.

Example 23. A method of making predictions for control flow changing instructions comprising:
identifying within a fetch queue a sequence of instructions to be fetched for execution;
predicting upcoming control flow and controlling which instructions are identified in the fetch queue in dependence on the prediction;
wherein predicting the upcoming control flow comprises predicting multi-taken sequences, wherein a multi-taken sequence is a sequence of instructions in which control flow is diverted by a first control flow changing instruction to a series of instructions terminating in a second control flow changing instruction that diverts control flow to a target address;
calculating confidence levels for respective multi-taken sequences, each said confidence level being indicative of a confidence in an accuracy of prediction of its respective multi-taken sequence;
allowing, when the confidence level for a particular multi-taken sequence satisfies a prediction confidence condition, the particular multi-taken sequence to be predicted by the prediction circuitry;
causing, when the particular multi-taken sequence is predicted, the series of instructions and the target instruction for the multi-taken sequence to be identified in the fetch queue; and
beginning to make further predictions starting from the target address for the particular multi-taken sequence.

Example 24. A non-transitory computer-readable medium to store computer-readable code for fabrication of an apparatus comprising:
a fetch queue to identify a sequence of instructions to be fetched for execution;
prediction circuitry to predict upcoming control flow and to control which instructions are identified in the fetch queue in dependence on the prediction,
wherein the prediction circuitry is operable to predict multi-taken sequences,
wherein a multi-taken sequence is a sequence of instructions in which control flow is diverted by a first control flow changing instruction to a series of instructions terminating in a second control flow changing instruction that diverts control flow to a target address; and
prediction confidence calculation circuitry to calculate confidence levels for respective multi-taken sequences, each said confidence level being indicative of a confidence in an accuracy of prediction of its respective multi-taken sequence, wherein the prediction confidence tracking circuitry is configured to allow, when the confidence level for a particular multi-taken sequence satisfies a prediction confidence condition, the particular multi-taken sequence to be predicted by the prediction circuitry, wherein the prediction circuitry is configured to cause, when the prediction circuitry predicts the particular multi-taken sequence, the series of instructions and the target instruction for the particular multi-taken sequence to be identified in the fetch queue and to begin making further predictions starting from the target address for the particular multi-taken sequence.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
a fetch queue to identify a sequence of instructions to be fetched for execution;
prediction circuitry to predict upcoming control flow and to control which instructions are identified in the fetch queue in dependence on the prediction,
wherein the prediction circuitry is operable to predict multi-taken sequences, wherein each multi-taken sequence of the multi-taken sequences is a sequence of instructions in which control flow is diverted by a first control flow changing instruction to a series of instructions terminating in a second control flow changing instruction that diverts control flow to a target address;
target prediction storage to store a plurality of entries that are used to indicate the multi-taken sequences;
wherein the prediction circuitry is operable to predict conditional multi-taken sequences of the multi-taken sequences for which the second control flow changing instruction of the conditional multi-taken sequences is a conditional control flow changing instruction, wherein at a time of predicting the conditional multi-taken sequences of the multi-taken sequences, it is not known whether the conditional control flow changing instructions will turn out to be taken; and
prediction confidence calculation circuitry to calculate confidence levels for respective multi-taken sequences, each said confidence level being indicative of a confidence in an accuracy of prediction of its respective multi-taken sequence, wherein the prediction confidence calculation circuitry is configured to allow, when a confidence level for a particular multi-taken sequence satisfies a prediction confidence condition, the particular multi-taken sequence to be predicted by the prediction circuitry;
wherein the prediction confidence calculation circuitry is configured to calculate a confidence level for a given conditional multi-taken sequence based at least in part on a confidence that a second control flow changing instruction of the given conditional multi-taken sequence will be taken, wherein the prediction circuitry is configured to store, in the target prediction storage, an entry indicative of the given conditional multi-taken sequence and to use the entry indicative of the given conditional multi-taken sequence to predict the given conditional multi-taken sequence; and wherein the prediction circuitry is configured to cause, when the prediction circuitry predicts the particular multi-taken sequence, a series of instructions and a target instruction for the particular multi-taken sequence to be identified in the fetch queue and to begin making further predictions starting from a target address for the particular multi-taken sequence.

2. The apparatus according to claim 1, wherein:
the prediction confidence calculation circuitry is configured to calculate the confidence level for a given multi-taken sequence of the respective multi-taken sequences based at least in part on a confidence that any conditional control flow changing instructions occurring in a series of instructions of the given multi-taken sequence before a second control flow changing instruction of the given multi-taken sequence will not be taken.

3. The apparatus according to claim 1, wherein:
the prediction circuitry is operable to predict sure multi-taken sequences for which a second control flow changing instruction is unconditionally taken and for which a series of instructions is absent any other control flow changing instructions; and
the prediction confidence calculation circuitry is configured to allow the prediction circuitry to predict the sure multi-taken sequences without calculating a confidence level for the sure multi-taken sequences.

4. The apparatus according to claim 1, wherein:
when the confidence level for the particular multi-taken sequence does not satisfy the prediction confidence condition, the prediction confidence calculation circuitry is configured to prevent the prediction circuitry from predicting the particular multi-taken sequence.

5. The apparatus according to claim 1, wherein the prediction confidence calculation circuitry is configured to:
detect a confidence lowering event in respect of a given multi-taken sequence of the respective multi-taken sequences; and
in response to detecting the confidence lowering event, prevent the prediction circuitry from predicting the given multi-taken sequence.

6. The apparatus according to claim 5, wherein:
the prediction confidence calculation circuitry is configured to detect the confidence lowering event when a misprediction occurs using the given multi-taken sequence.

7. The apparatus according to claim 5, wherein:
the prediction confidence calculation circuitry is configured to detect the confidence lowering event when a sequence of instructions other than the given multi-taken sequence is observed following a first control flow changing instruction for the given multi-taken sequence.

8. The apparatus according to claim 1, further comprising:
confidence information storage circuitry to store confidence information maintained by the prediction confidence calculation circuitry;

wherein the prediction confidence calculation circuitry is configured to reference the confidence information to determine, for the particular multi-taken sequence, whether the prediction confidence condition is satisfied.

9. The apparatus according to claim 8, wherein:
the confidence information storage circuitry is arranged to store confidence information indicative of the confidence level for each of a plurality of the respective multi-taken sequences and a threshold for each of the plurality of the respective multi-taken sequences; and
the prediction confidence calculation circuitry is configured to determine that the prediction confidence condition is satisfied when the confidence level for the particular multi-taken sequence satisfies a threshold for the particular multi-taken sequence.

10. The apparatus according to claim 9, wherein:
the prediction confidence calculation circuitry is configured to increase the confidence level for the particular multi-taken sequence when the particular multi-taken sequence is observed and to reset the confidence level for the particular multi-taken sequence when either a sequence of instructions other than the particular multi-taken sequence is observed following a first control flow changing instruction of the particular multi-taken sequence or a misprediction occurs using the particular multi-taken sequence.

11. The apparatus according to claim 10, wherein:
the prediction confidence calculation circuitry is configured to increase the threshold for the particular multi-taken sequence when a misprediction occurs using the particular multi-taken sequence.

12. The apparatus according to claim 8, wherein:
the prediction circuitry operates on predict blocks, each of the predict blocks comprising a plurality of instructions; and
the confidence information is tagged by an address for a predict block of the predict blocks wherein the confidence information is indicative of a confidence that a multi-taken sequence, having as a first control flow changing instruction, any of the instructions in the plurality of instructions, will be taken.

13. The apparatus according to claim 1, further comprising:
tagged geometric history length (TAGE) prediction circuitry to predict whether conditional control flow changing instructions will be taken or not taken based on a plurality of TAGE tables tagged by a range of lengths of execution history;
wherein the prediction circuitry is configured to maintain a TAGE class value for the conditional control flow changing instructions indicative of a number of the plurality of TAGE tables in which a hit needs to be detected for a prediction to be made based on the TAGE prediction circuitry; and
the prediction confidence calculation circuitry is configured to use, as a confidence level, the TAGE class value and to determine that the prediction confidence condition is satisfied when the TAGE class value satisfies a predetermined threshold.

14. The apparatus according to claim 1, wherein:
the prediction circuitry is configured to make, when predicting the particular multi-taken sequence of the multi-taken sequences, predictions in respect of the first control flow changing instruction of the multi-taken sequence and the second control flow changing instruction of the particular multi-taken sequence in the same clock cycle.

15. The apparatus according to claim 1 wherein:
the prediction circuitry is configured to reference the target prediction storage to predict the multi-taken sequences; and
to allow the prediction circuitry to predict the particular multi-taken sequence, the prediction confidence calculation circuitry is configured to store, in the target prediction storage, an indication of the particular multi-taken sequence.

16. The apparatus according to claim 15, wherein:
to prevent the prediction circuitry from predicting the particular multi-taken sequence, the prediction confidence calculation circuitry is configured to prevent the indication of the particular multi-taken sequence from being stored in the target prediction storage or to invalidate at least one entry in the target prediction storage in which the indication of the particular multi-taken sequence is stored.

17. The apparatus according to claim 15, wherein:
the target prediction storage is configured to store the multi-taken sequences in a compressed form by storing at least an indication of a target address of the first control flow changing instructions and a target address of the multi-taken sequences as an offset from an address of the first control flow changing instructions.

18. A method of making predictions for control flow changing instructions comprising:
identifying within a fetch queue a sequence of instructions to be fetched for execution;
predicting upcoming control flow and controlling which instructions are identified in the fetch queue in dependence on the prediction;
wherein predicting the upcoming control flow comprises predicting multi-taken sequences, wherein each multi-taken sequence of the multi-taken sequences is a sequence of instructions in which control flow is diverted by a first control flow changing instruction to a series of instructions terminating in a second control flow changing instruction that diverts control flow to a target address;
storing in target prediction storage a plurality of entries that are used to indicate the multi-taken sequences;
wherein predicting multi-taken sequences comprises predicting conditional multi-taken sequences of the multi-taken sequences for which the second control flow changing instruction of the conditional multi-taken sequences is a conditional control flow changing instruction, wherein at a time of predicting the conditional multi-taken sequences of the multi-taken sequences, it is not known whether the conditional control flow changing instructions will turn out to be taken;
calculating confidence levels for respective multi-taken sequences, each said confidence level being indicative of a confidence in an accuracy of prediction of its respective multi-taken sequence;
wherein calculating a confidence level for a given conditional multi-taken sequence comprises calculating the confidence level for the given conditional multi-taken sequence based at least in part on a confidence that a second control flow changing instruction of the given conditional multi-taken sequence will be taken;
allowing, in response to a confidence level for a particular multi-taken sequence satisfying a prediction confidence condition, the particular multi-taken sequence to be predicted;

storing, in the target prediction storage, an entry indicative of the given conditional multi-taken sequence and using the entry indicative of the given conditional multi-taken sequence to predict the given conditional multi-taken sequence;

causing, in response to the particular multi-taken sequence being predicted, a series of instructions and a target instruction for the particular multi-taken sequence to be identified in the fetch queue; and beginning to make further predictions starting from a target address for the particular multi-taken sequence.

19. A non-transitory computer-readable medium to store computer-readable code for fabrication of an apparatus comprising:

a fetch queue to identify a sequence of instructions to be fetched for execution;

prediction circuitry to predict upcoming control flow and to control which instructions are identified in the fetch queue in dependence on the prediction, wherein the prediction circuitry is operable to predict multi-taken sequences, wherein each multi-taken sequence of the multi-taken sequences is a sequence of instructions in which control flow is diverted by a first control flow changing instruction to a series of instructions terminating in a second control flow changing instruction that diverts control flow to a target address;

target prediction storage to store a plurality of entries that are used to indicate the multi-taken sequences;

wherein the prediction circuitry is operable to predict conditional multi-taken sequences of the multi-taken sequences for which the second control flow changing instruction of the conditional multi-taken sequences is a conditional control flow changing instruction, wherein at a time of predicting the conditional multi-taken sequences of the multi-taken sequences, it is not known whether the conditional control flow changing instructions will turn out to be taken; and prediction confidence calculation circuitry to calculate confidence levels for respective multi-taken sequences, each said confidence level being indicative of a confidence in an accuracy of prediction of its respective multi-taken sequence, wherein the prediction confidence calculation circuitry is configured to allow, when a confidence level for a particular multi-taken sequence satisfies a prediction confidence condition, the particular multi-taken sequence to be predicted by the prediction circuitry;

wherein the prediction confidence calculation circuitry is configured to calculate a confidence level for a given conditional multi-taken sequence based at least in part on a confidence that a second control flow changing instruction of the given conditional multi-taken sequence will be taken, wherein the prediction circuitry is configured to store, in the target prediction storage, an entry indicative of the given conditional multi-taken sequence and to use the entry indicative of the given conditional multi-taken sequence to predict the given conditional multi-taken sequence;

wherein the prediction circuitry is configured to cause, when the prediction circuitry predicts the particular multi-taken sequence, a series of instructions and a target instruction for the particular multi-taken sequence to be identified in the fetch queue and to begin making further predictions starting from a target address for the particular multi-taken sequence.

* * * * *